Oct. 24, 1933.  H. G. HILLS  1,932,160

ELECTROLYTIC PRODUCTION OF WHITE LEAD

Original Filed May 28, 1932

H. G. Hills
INVENTOR

By Marks&Clerk
ATTYS.

Patented Oct. 24, 1933

1,932,160

UNITED STATES PATENT OFFICE 1,932,160

ELECTROLYTIC PRODUCTION OF WHITE LEAD

Horace Gastineau Hills, Stockport, England

Original application May 28, 1932, Serial No. 614,211, and in Great Britain October 15, 1931. Divided and this application December 6, 1932. Serial No. 645,989

2 Claims. (Cl. 204—5)

This invention relates to the electrolytic production of white lead by the employment of an aqueous electrolyte containing a nitrate such as sodium or other alkali metal nitrate in solution. This case is a division of my copending application Serial No. 614,211 filed May 28, 1932.

The invention comprises the improved construction and arrangement of electrolyzing apparatus as hereinafter described and claimed.

Figure 2:
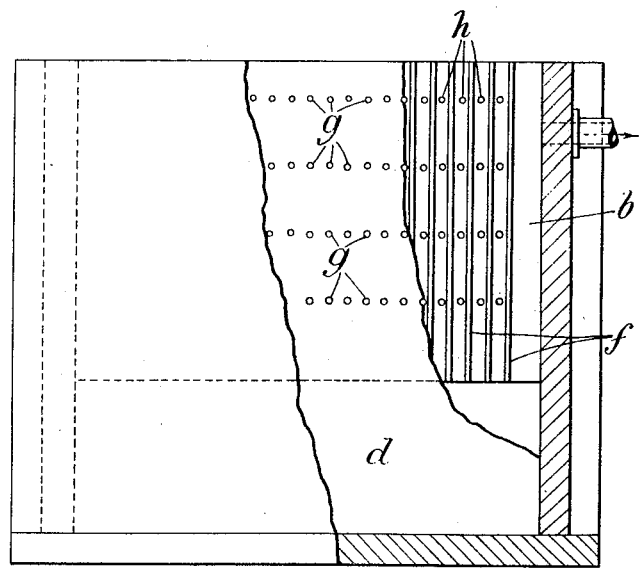
Figure 1:
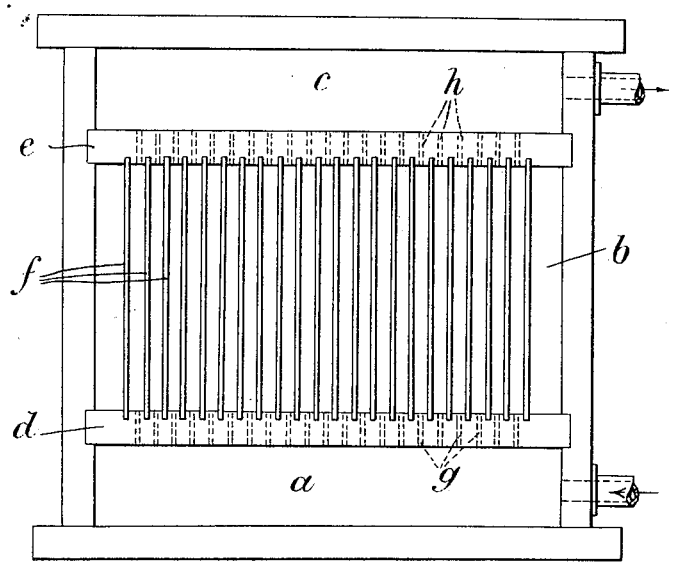

In the accompanying drawing, Figure 1 is a plan view and Figure 2 an elevation with parts broken away, of an electrolyzer in accordance with the invention.

The electrolyzer vat or cell comprises an antechamber or compartment $a$, a depositing chamber $b$ and an exit chamber $c$, there being vertical partitions $d$ and $e$ dividing the depositing chamber $b$ from the other chambers which are at its opposite sides. The electrodes $f$ are slid into vertical slots or grooves in the adjacent faces of said partitions $d$ and $e$. The electrolyte enters and leaves the depositing chamber by way of holes $g$ and $h$ respectively located between the vertical slots so that the electrolyte is caused to flow between the electrodes from side to side of the chamber. The total cross sectional area of the said holes is proportioned with relation to the rate of inflow of electrolyte to the ante-chamber to ensure a substantially even flow through all the holes. In practice I have found that if the holes are of excessive total area with relation to the quantity of electrolyte being passed, the rate of flow between some of the electrodes may be so slow that the carbon dioxide is used up before the electrolyte reaches the exit chamber, resulting in unsatisfactory working of the electrolyzer and the production of a mixed or inferior deposit.

The electrolyte by being passed through both an ante-chamber $a$ and an exit chamber $c$ at the opposite sides of the depositing chamber $b$ has its flow steadied with the result that in conjunction with the proper proportioning of the holes $g$ and $h$ giving access to and exit from the depositing chamber, I am able to obtain uniform deposits of white lead.

The electrolyte which leaves the electrolyzer is re-saturated with carbon dioxide, by being atomized in the presence of carbon dioxide, and returned to the ante-chamber.

Generally, for securing saturation of the electrolyte with carbon dioxide atomization of the electrolyte in the presence of gaseous carbon dioxide is alone resorted to, and to secure the necessary conditions for effecting saturation the electrolyte is maintained in circulation through the electrolytic cell or cells, the electrolyte being atomized in suitable apparatus external to the cells in the presence of carbon dioxide and thereafter returned to the cells. By this method of securing carbonation, the electrolyte may be maintained substantially fully charged with carbon dioxide while passing through the cell and its action in the cell may thus be rendered uniform.

Within limits the amperage, voltage and concentration of salt in the electrolyte are mutually inter-dependent factors.

Preferably, with an electrolyte containing in solution 1% of nitrate of soda, the electrodes are spaced ½" to ¾" apart, the current density employed being as a minimum 20 amperes and usually 25 amperes or more. The anodes are lead.

The employment in the electrolyte of a colloid such as glue operates to prevent the production of spongy lead and in this and in other ways has a favourable influence upon the character of the product.

If desired, the electrolyzer may be arranged for a downward flow of electrolyte instead of a horizontal flow.

The electrolyte may consist of an aqueous solution of sodium nitrate to which has been added a proportion of a water-dispersible colloid, for instance glue or gelatine. The glue or gelatine may be used as a 0.01% solution in water. About 4 pounds of gelatine or glue are used in the production of one ton of white lead.

Preferably, the electrolyte consists of a weak solution of sodium nitrate, containing, for example, 0.75 to 2 percent of sodium nitrate.

The electrodes $f$ are spaced at a distance of ½" to ¾" apart, and the applied current has a density of from 20 to 25 amperes per square foot of immersed cathode surface. The anodes are lead. A small proportion of formic acid, which may be in the form of a 1% solution in water; may be added to the electrolyte to correct the alkalinity which may develop in the electrolyte.

What I claim is:

1. An electrolyzer for the electrolytic production of white lead comprising, in combination, a depositing chamber, an antechamber at the inlet side of the depositing chamber, an exit chamber at the outlet side of said depositing chamber, partitions between said depositing chamber and said exit and ante-chambers, vertical electrodes disposed parallel and in close proximity to one another in said depositing chamber and at right angles to said partitions, and means delivering electrolyte successively through the ante-chamber, through the spaces between the electrodes in the depositing chamber and through the exit chamber.

2. An electrolyzer for the electrolytic production of white lead comprising, in combination an outer casing, two partitions extending across the casing and dividing it into three chambers, an antechamber, a depositing chamber, and an exit chamber, vertical electrodes extending parallel and in close proximity to one another between, and at right angles to, said partitions which are grooved to support the electrodes and apertured to permit the electrolyte to flow in uniform streams through the spaces between the electrodes from the ante- to the exit-chamber.

HORACE GASTINEAU HILLS.